United States Patent
Jiao

(10) Patent No.: US 10,764,420 B2
(45) Date of Patent: Sep. 1, 2020

(54) FLASH ASSEMBLY OF MOBILE TERMINAL, CONTROL SYSTEM THEREOF AND CONTROL METHOD THEREOF

(71) Applicant: JRD COMMUNICATION (SHENZHEN) LTD, Shenzhen, Guangdong (CN)

(72) Inventor: Tao Jiao, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 16/309,942

(22) PCT Filed: Oct. 9, 2017

(86) PCT No.: PCT/CN2017/105412
§ 371 (c)(1),
(2) Date: Dec. 14, 2018

(87) PCT Pub. No.: WO2018/090758
PCT Pub. Date: May 24, 2018

(65) Prior Publication Data
US 2019/0166243 A1 May 30, 2019

(30) Foreign Application Priority Data

Nov. 17, 2016 (CN) .......................... 2016 1 1012252

(51) Int. Cl.
*H04M 1/02* (2006.01)
*H04W 4/38* (2018.01)
(Continued)

(52) U.S. Cl.
CPC ........ *H04M 1/72522* (2013.01); *G03B 15/05* (2013.01); *H04N 5/2256* (2013.01);
(Continued)

(58) Field of Classification Search
CPC ....... H04W 4/38; H04W 88/02; H04W 88/06; H04W 92/08; H04M 1/0218; H04M 1/0229; H04M 1/0264; H04M 1/22
See application file for complete search history.

(56) References Cited

U.S. PATENT DOCUMENTS 9,628,687 B2    4/2017   Chu
9,692,955 B1 *   6/2017   Premutico ............ H04N 5/2256
(Continued)

FOREIGN PATENT DOCUMENTS

CN      103167133 A     6/2013
CN      103369083 A    10/2013
(Continued)

*Primary Examiner* — San Htun

(57) ABSTRACT

The present disclosure provides a flash assembly of a mobile terminal, the flash assembly is a display assembly, and the display assembly disposed at a front end of a camera assembly of the mobile terminal and connects to a processor of the mobile terminal via an I2C. The present disclosure also provides a control system, comprising a scene predictor, a controller and a flash assembly. A control method is also provided. Compared with the related art, the protective cover of the camera is replaced by a display assembly, thereby reducing the number of components; and the display assembly can reduce the thermal output.

7 Claims, 5 Drawing Sheets

(51) Int. Cl.
*H04M 1/725* (2006.01)
*H04N 5/235* (2006.01)
*G03B 15/05* (2006.01)
*H04N 5/232* (2006.01)
*H04N 5/225* (2006.01)
*H04N 9/04* (2006.01)

(52) U.S. Cl.
CPC ......... *H04N 5/2351* (2013.01); *H04N 5/2354* (2013.01); *H04N 5/23216* (2013.01); *H04N 9/045* (2013.01)

(56) References Cited

U.S. PATENT DOCUMENTS

| | | | |
|---|---|---|---|
| 2004/0075762 A1* | 4/2004 | Okubo | H04N 5/2354 348/371 |
| 2007/0248342 A1* | 10/2007 | Tamminen | G03B 7/16 396/67 |
| 2010/0074610 A1 | 3/2010 | Trevelyan | |
| 2012/0312976 A1 | 12/2012 | Boulanger et al. | |
| 2013/0038763 A1* | 2/2013 | Tozawa | H04N 5/367 348/247 |
| 2013/0057713 A1* | 3/2013 | Khawand | H04N 5/232 348/208.1 |
| 2014/0085498 A1* | 3/2014 | Hatano | H04N 9/07 348/221.1 |
| 2014/0098040 A1* | 4/2014 | Kwon | G06F 3/01 345/173 |
| 2015/0002735 A1 | 1/2015 | Moskovchenko | |
| 2016/0088228 A1 | 3/2016 | Tsai | |
| 2016/0088278 A1* | 3/2016 | Velarde | G03B 7/17 348/371 |
| 2016/0109232 A1 | 4/2016 | Shin et al. | |
| 2016/0248986 A1 | 8/2016 | Mattisson et al. | |

FOREIGN PATENT DOCUMENTS

| | | |
|---|---|---|
| CN | 106027916 A | 10/2016 |
| WO | 2012/072855 A1 | 6/2012 |

* cited by examiner

FLASH ASSEMBLY OF MOBILE TERMINAL, CONTROL SYSTEM THEREOF AND CONTROL METHOD THEREOF

CROSS-REFERENCE TO RELATED APPLICATIONS

The present application is a 35 U.S.C. § 371 National Phase conversion of International (PCT) Patent Application No. PCT/CN2017/105412 filed on Oct. 9, 2017, which claims foreign priority of Chinese Patent Application No. 201611012252.1, filed on Nov. 17, 2016 in the State Intellectual Property Office of China, the contents of all of which are hereby incorporated by reference.

TECHNICAL FIELD

The present disclosure relates to image processing technology, in particular to a flash assembly of a mobile terminal, a control system thereof and a control method thereof.

BACKGROUND

Current mainstream smartphones are equipped with a flash to improve the dark-shooting effect. Although the LED light source is a cold light source, it has a luminous efficiency of approximately 100lm/W, and an electro-optic conversion efficiency of about 20%-30%. In other words, about 70% of the electrical energy becomes heat. As mobile phones are getting more and more compact, the CPU, the screen, the battery and the like have become the main sources of heat, while the design of mobile phones has never considered enhancing the heat dissipation of the LED flash which serves as an auxiliary light source for photographing. Consequently, excessive use will result in poor heat dissipation, high heating temperature, and thus reduction of the life of the LED flash.

SUMMARY

In order to overcome the deficiencies of the related art, the present disclosure provides a flash assembly of a mobile terminal, a control system thereof and a control method thereof, wherein a display assembly is used as the flash assembly which meanwhile serves as a protective cover of a camera assembly, thereby reducing the thermal output of the mobile terminal, the number of components and the cost of production.

The present disclosure provides a flash assembly of a mobile terminal, wherein the flash assembly disposed on the mobile terminal, the flash assembly is a display assembly, the display assembly is disposed at a front end of a camera assembly of the mobile terminal and connects to a processor of the mobile terminal via an I2C.

The present disclosure provides a control system for a flash assembly of a mobile terminal, the control system comprising:

a flash assembly disposed on the mobile terminal, the flash assembly being a display assembly disposed at a front end of a camera assembly of the mobile terminal;

a scene predictor configured to acquire an ambient light color temperature and an ambient light brightness of a current scene through the camera assembly, calculate a focus point, a target value for color temperature adjustment and a target value for brightness adjustment using 3A algorithm, and transmit the focus point, the target value for color temperature adjustment and the target value for brightness adjustment to a controller;

the controller configured to calculate correspondingly a shutter speed, a sensitivity of a sensor of the camera assembly, and a current ratio outputted by the flash assembly according to the target value for color temperature adjustment and the target value for brightness adjustment; the flash assembly outputting a corresponding display brightness and a corresponding display color temperature according to the current ratio.

Further, the control system also comprising a manual regulator configured to adjust parameters of brightness, color temperature, and flash frequency of the flash assembly manually and transmit the parameters to the flash controller, the controller outputting a corresponding current ratio according to the parameters, or the manual regulator configured to adjust the color of the flash assembly.

Further, the 3A algorithm includes an automatic focus algorithm, an automatic exposure algorithm and an automatic white balance algorithm.

The present disclosure also provides a control method of a flash assembly, comprising:

a scene predictor prejudging an ambient light color temperature and an ambient light brightness of a current scene to obtain data of the same, calculating a focus point, a target value for color temperature adjustment and a target value for brightness adjustment using 3A algorithm, and transmitting the focus point, the target value for color temperature adjustment and the target value for brightness adjustment to a controller;

the controller calculating correspondingly a shutter speed, a sensitivity of a sensor of the camera assembly, and a current ratio outputted by the flash assembly according to the target value for color temperature adjustment and the target value for brightness adjustment; and the flash assembly outputting correspondingly a display color temperature and a display brightness.

Further, the 3A algorithm includes an automatic focus algorithm, an automatic exposure algorithm and an automatic white balance algorithm.

Further, the automatic focus algorithm searches for a maximum focus value in the current scene by adjusting a position of a lens of the camera assembly, and a lens motor drives the lens to a position corresponding to the maximum focus value, thereby completing focusing and determining the focus point.

Further, the automatic exposure algorithm includes:

obtaining a pre-flash image by pre-flashing the flash assembly after obtaining an original image of the current scene through the camera assembly;

analyzing the original image to obtain a brightness value of the original image, and comparing the brightness value of the original image with a target brightness value to obtain an exposure setting value of the original image;

analyzing the pre-flash image to obtain a brightness value of the pre-flash image, and comparing the brightness value of the pre-flash image with the target brightness value to obtain an exposure setting value of the pre-flash image; and averaging the exposure setting value of the original image and the exposure setting value of the pre-flash image to finally obtain the target value for brightness adjustment;

wherein the scene predictor decreasing the brightness value of the original image or the pre-flash image by the exposure setting value thereof when the brightness value of the original image or the pre-flash image is greater than the target brightness value to define an overexposure; and the scene predictor increasing the brightness value of the original image or the pre-flash image by the exposure setting value thereof when the brightness value of the original image or the pre-flash image is smaller than the target brightness value to define an underexposure.

Further, the automatic white balance algorithm includes:

obtaining a pre-flash image by pre-flashing the flash assembly after obtaining an original image of the current scene through the camera assembly;

analyzing the original image, and performing statistical operations on R/G and B/G information in the original image to obtain color temperature information of the original image;

analyzing the pre-flash image, and performing statistical operations on R/G and B/G information in the pre-flash image to obtain color temperature information of the pre-flash image; and adding the color temperature information of the original image to the color temperature information of the pre-flash image to finally obtain the target value for color temperature adjustment.

Further, the flash assembly is an OLED display assembly.

Compared with the related art, the present disclosure reduces the number of components by replacing the protective cover of the camera with the display assembly, and using the display assembly as a flash assembly can reduces the thermal output.

DETAILED DESCRIPTION

The present disclosure will be further described in detail below with reference to the accompanying drawings and embodiments.

Figure 1:
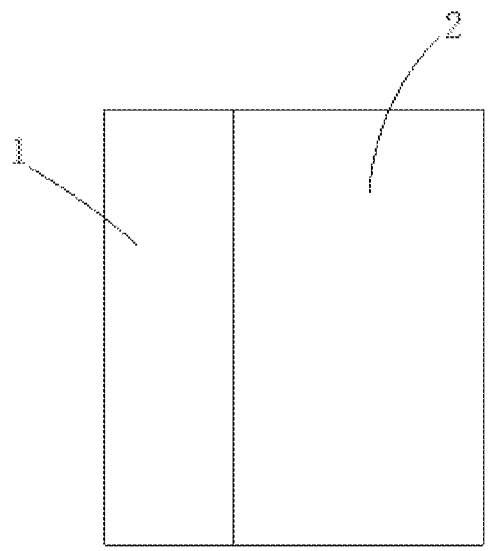
FIG. 1 is a schematic view showing a arrangement position of a display assembly and a camera assembly of the present disclosure.

As shown in FIG. 1, a flash assembly of a mobile terminal according to the present disclosure may be disposed on the mobile terminal. The flash assembly may be a display assembly 1 disposed at a front end of a camera assembly 2 of the mobile terminal and replacing a protective cover of the existing camera assembly 2. The display assembly 1 may be connected to a processor of the mobile terminal via an I2C. By replacing protective cover with the display assembly 1, the present disclosure reduces the number of components and the cost.

Figure 7:
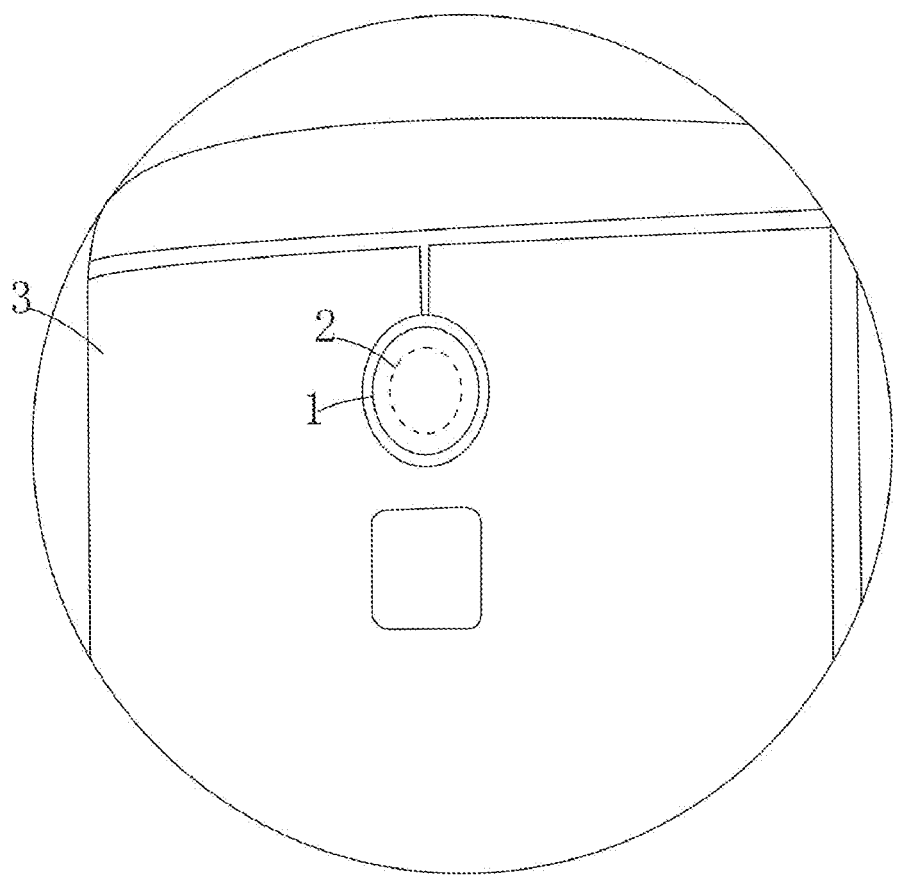
FIG. 7 is a schematic structural view showing a specific arrangement position of the display assembly of the present disclosure.

FIG. 7 shows a specific arrangement position of the display assembly, the display assembly 1 may be disposed on a rear housing 3 of the mobile terminal and at a front end of the camera assembly 2 (the dotted portion in the drawing).

In the embodiments of the present disclosure, the display assembly 1 may be a liquid crystal display assembly, and the liquid crystal display assembly may be an OLED (Organic Light-Emitting Diode) display assembly.

Figure 6:
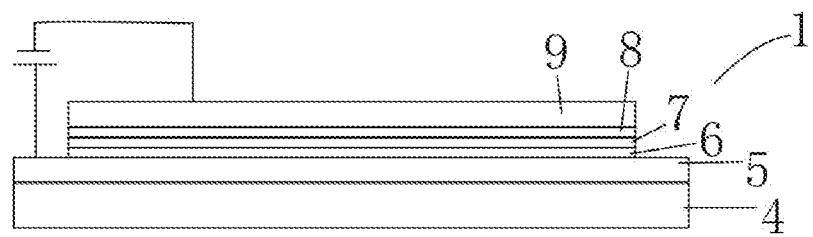
FIG. 6 is a schematic structural view of an OLED display assembly of the present disclosure.

As shown in FIG. 6, the OLED display assembly of the present disclosure may include a substrate 4 on which an anode 5, a hole transport layer 6, an organic light-emitting layer 7, an electron transport layer 8, and a cathode 9 may be sequentially provided.

Figure 2:
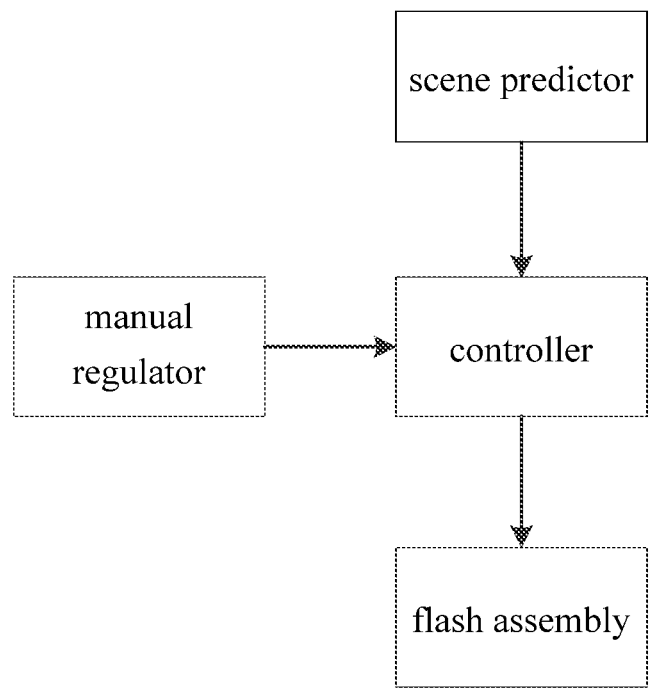
FIG. 2 is a block diagram of the control system of the present disclosure.

As shown in FIG. 2, a control system of a mobile terminal may include a flash assembly and the flash assembly may be a display assembly disposed at a front end of a camera assembly. The control system may further include:

a scene predictor configured to acquire an ambient light color temperature and an ambient light brightness of a current scene through the camera assembly, calculate a focus point, a target value for color temperature adjustment and a target value for brightness adjustment using 3A algorithm, and transmit the focus point, the target value for color temperature adjustment and the target value for brightness adjustment to a controller; and the controller configured to calculate correspondingly a shutter speed, a sensitivity of an image sensor of the camera assembly, and a current ratio outputted by the flash assembly according to the target value for color temperature adjustment and the target value for brightness adjustment, and to control the display brightness and the display color temperature of the flash assembly via the current ratio outputted by the flash assembly; the flash assembly configured to output a corresponding display brightness and a corresponding display color temperature, which flash assembly is preferably an OLED display assembly.

Block S201: obtaining a pre-flash image by pre-flashing the flash assembly after obtaining an original image of the current scene through the camera assembly.

The calculation of the shutter speed and the calculation of the sensitivity may be both implemented using the related art, and no specific limitations are set herein.

The control system of the present disclosure may further include a manual regulator for manually adjusting parameters of the display brightness, the display color temperature, and the flash frequency of the flash assembly and transmitting the parameters to the flash controller, and the controller may output a corresponding current ratio according to the parameters, such that the photo has better performance in the Automatic Exposure (AE) and the Automatic White Balance (AWB).

The manual regulator may also be used to adjust the display color outputted by the flash assembly, and the controller may adjust a corresponding current ratio according to the desired color, so that the flash assembly displays the corresponding display color, and may function as a flashlight for illumination.

Figure 3:
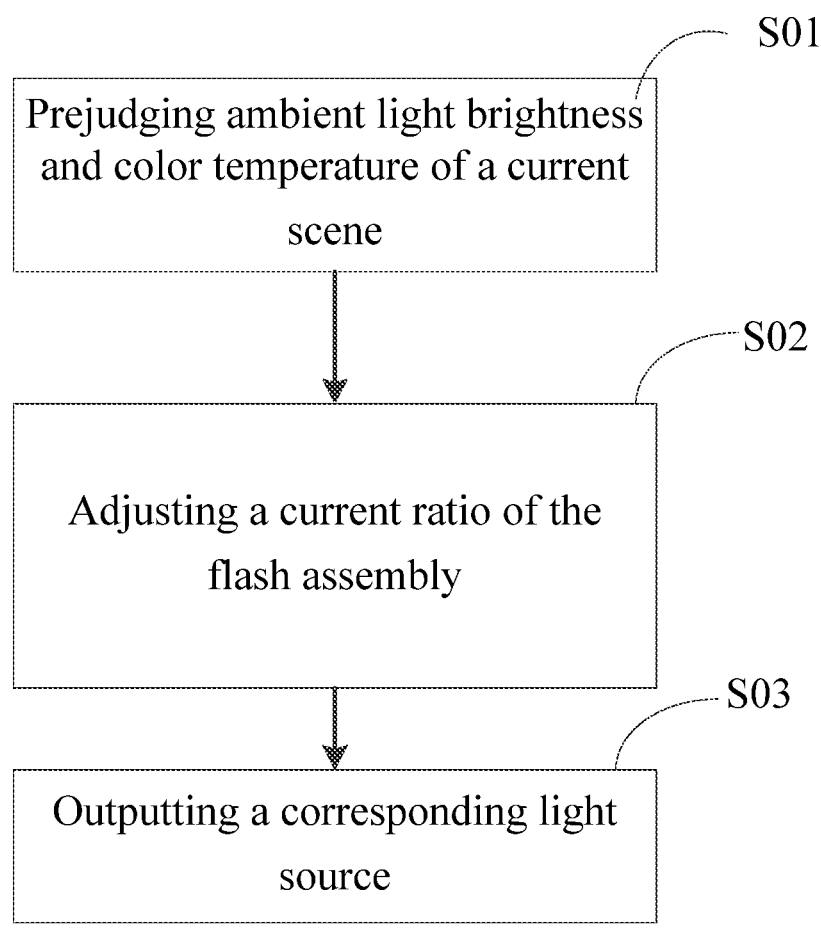
FIG. 3 is a flow diagram of the control system of the present disclosure.

Referring to FIG. 3, a control method of a flash assembly may include the following blocks:

Block S01: a scene predictor prejudging an ambient light color temperature and an ambient light brightness of a current scene to obtain data of the same, calculating a focus point, a target value for color temperature adjustment and a target value for brightness adjustment using 3A algorithm, and transmitting the focus point, the target value for color temperature adjustment and the target value for brightness adjustment to a controller.

Block S02: the controller calculating correspondingly a shutter speed, a sensitivity of a sensor of the camera assembly, and a current ratio outputted by the flash assembly according to the target value for color temperature adjustment and the target value for brightness adjustment.

Block S03: the flash assembly outputting correspondingly a display color temperature and a display brightness.

The 3A algorithm may include an automatic focus algorithm (AF), an automatic exposure algorithm (AE), and an automatic white balance algorithm (AWB).

The automatic focus algorithm (AF) may search for a maximum focus value (FV) in the current scene by adjusting a position of a lens of the camera assembly, and a lens motor drives the lens to a position corresponding to the maximum focus value, thereby completing focusing and determining the focus point.

Figure 4:
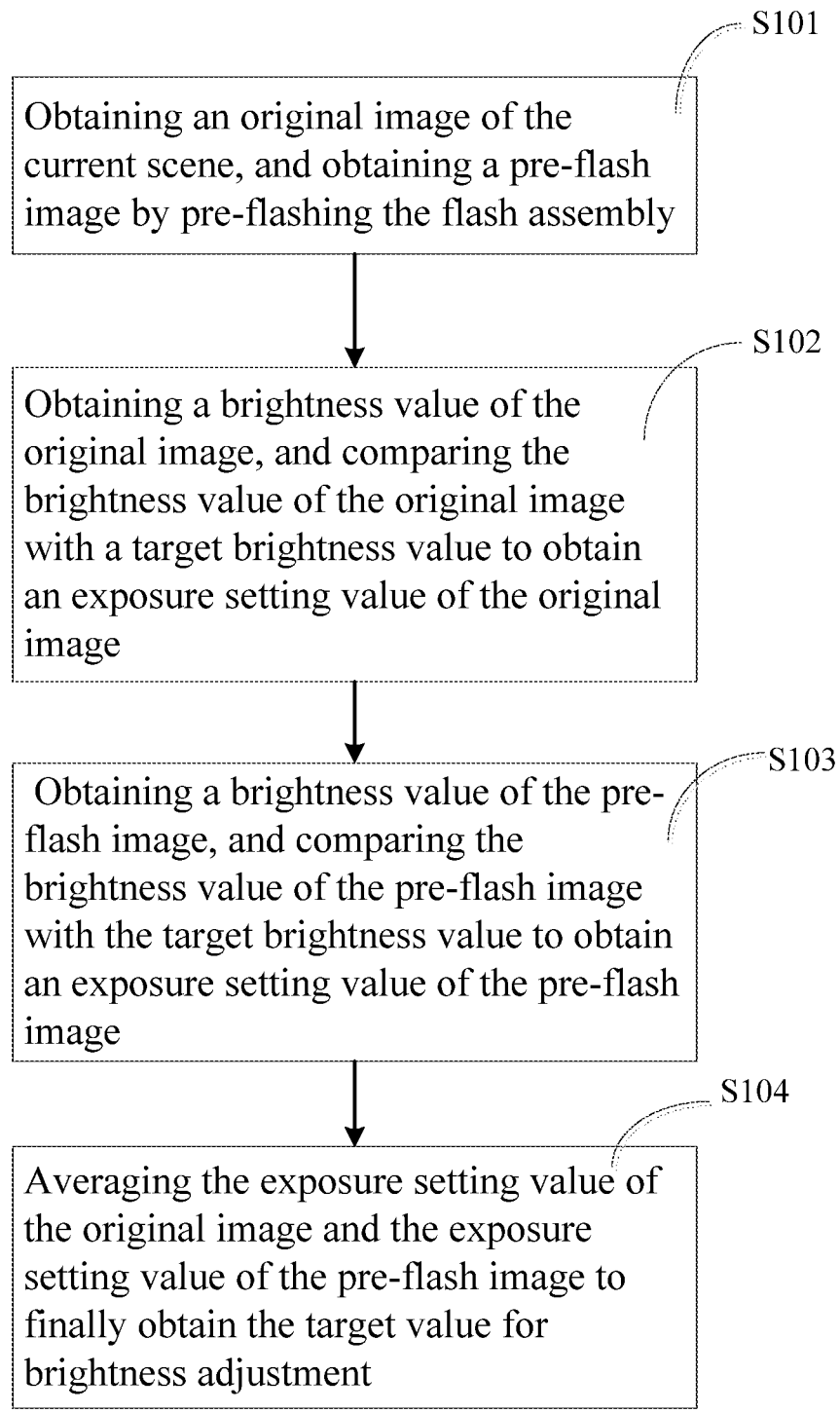
FIG. 4 is a flow diagram of an automatic exposure algorithm of the present disclosure.

As shown in FIG. 4, the automatic exposure algorithm may include the following blocks:

Block S101: obtaining a pre-flash image by pre-flashing the flash assembly after obtaining an original image of the current scene through the camera assembly.

Block S102: analyzing the original image to obtain a brightness value (Y) of the original image, and comparing the brightness value (Y) of the original image with a target brightness value (AE target) to obtain an exposure setting value of the original image.

Block S103: analyzing the pre-flash image to obtain a brightness value (Y) of the pre-flash image, and comparing the brightness value (Y) of the pre-flash image with the target brightness value (AE target) to obtain an exposure setting value of the pre-flash image.

Block S104: averaging the exposure setting value of the original image and the exposure setting value of the pre-flash image to finally obtain the target value for brightness adjustment.

The target brightness value (AE target) is typically 47.

Where the brightness value (Y) of the original image or the pre-flash image is greater than the target brightness value to define an overexposure, the scene predictor decreases the brightness value of the original image or the pre-flash image by the exposure setting value thereof.

Where the brightness value (Y) of the original image or the pre-flash image is smaller than the target brightness value to define an underexposure, the scene predictor increases the brightness value of the original image or the pre-flash image by the exposure setting value thereof.

For example, when the original image or the pre-flash image has a brightness value of 30, which is smaller than the target brightness value, the brightness value of the original image or the pre-flash image should be increased by the exposure setting value thereof that is obtained by subtracting the brightness value thereof from 47, namely, the exposure setting value of the original image or the pre-flash image is 17 (47−30=17) in this case; and if the original image or the pre-flash image has a brightness value of 90, the exposure setting value of the original image or pre-flash image is −43 (47−90=−43) in this case.

Figure 5:
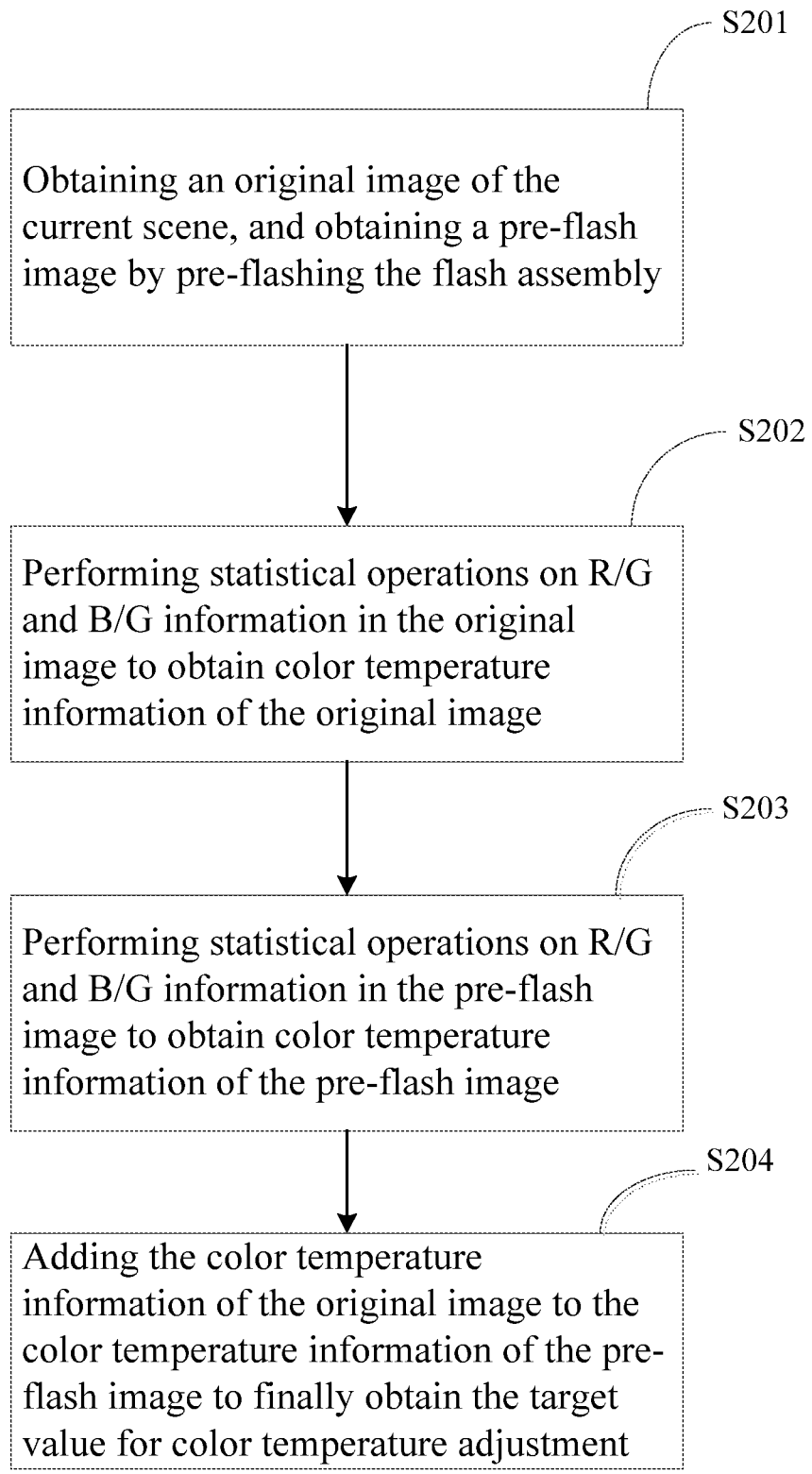
FIG. 5 is a flow diagram of an automatic white balance algorithm of the present disclosure.

As shown in FIG. 5, the automatic white balance algorithm (AWB) may include the following blocks:

Block S201: obtaining a pre-flash image by pre-flashing the flash assembly 1 after obtaining an original image of the current scene through the camera assembly.

Block S202: analyzing the original image, and performing statistical operations on R/G and B/G information in the original image to obtain color temperature information of the original image.

Block S203: analyzing the pre-flash image, and performing statistical operations on R/G and B/G information in the pre-flash image to obtain color temperature information of the pre-flash image.

Block S204: adding the color temperature information of the original image to the color temperature information of the pre-flash image to finally obtain the target value for color temperature adjustment.

The statistical operations on the R/G and B/G information in the original image or the pre-flash image specifically include converting the ambient light into an electrical signal via the sensor of the camera assembly, and performing a statistical operation on a value of the electrical signal of each pixel of the Bayer array in the sensor, thereby obtaining the color temperature information of the original image or the pre-flash image; statistical operations on the R/G and B/G information in the original image or the pre-flash image pertain may be the related art, and details thereon is not necessary herein.

As regards the mainstream display technology for current mobile terminals, the OLED display assembly is superior to the LED flash in terms of luminous efficiency, color and color temperature, and the thermal output of the OLED display assembly is much lower than that of the LED flash, which can reduce the thermal output of the flash. By incorporating and replacing the conventional LED flash and the protective cover of the camera assembly, the present disclosure expands the applications of the display assembly and is able to greatly reduce the cost of production.

While the present disclosure has been illustrated and described with respect to the specific embodiments, those skilled in the art could appreciate that various changes can be made to the forms and details without departing from the spirit and scope of the present disclosure defined by the appending claims and equivalents thereof.

What is claimed is:

1. A control method of a flash assembly, comprising:
a scene predictor prejudging an ambient light color temperature and an ambient light brightness of a current scene to obtain data of the ambient light color temperature and the ambient light brightness, calculating a focus point, a target value for color temperature adjustment and a target value for brightness adjustment using 3A algorithm, and transmitting the focus point, the target value for color temperature adjustment and the target value for brightness adjustment to a controller;
the controller calculating correspondingly a shutter speed, a sensitivity of a sensor of the camera assembly, and a current ratio outputted by the flash assembly according to the target value for color temperature adjustment and the target value for brightness adjustment; and
the flash assembly outputting correspondingly a display color temperature and a display brightness,
wherein the 3A algorithm comprises an automatic focus algorithm, an automatic exposure algorithm and an automatic white balance algorithm,
wherein the automatic exposure algorithm comprises:
obtaining a pre-flash image by pre-flashing the flash assembly after obtaining an original image of the current scene through the camera assembly;
analyzing the original image to obtain a brightness value of the original image, and comparing the brightness value of the original image with a target brightness value to obtain an exposure setting value of the original image;
analyzing the pre-flash image to obtain a brightness value of the pre-flash image, and comparing the brightness value of the pre-flash image with the target brightness value to obtain an exposure setting value of the pre-flash image; and averaging the exposure setting value of the original image and the exposure setting value of the pre-flash image to finally obtain the target value for brightness adjustment;

wherein the scene predictor decreasing the brightness value of the original image or the pre-flash image by the exposure setting value thereof when the brightness value of the original image or the pre-flash image is greater than the target brightness value to define an overexposure; and the scene predictor increasing the brightness value of the original image or the pre-flash image by the exposure setting value thereof when the brightness value of the original image or the pre-flash image is smaller than the target brightness value to define an underexposure.

2. The control method of a flash assembly according to claim 1, wherein the automatic focus algorithm searches for a maximum focus value in the current scene by adjusting a position of a lens of the camera assembly, and a lens motor drives the lens to a position corresponding to the maximum focus value, thereby completing focusing and determining the focus point.

3. The control method of a flash assembly according to claim 1, wherein the automatic white balance algorithm comprises:

obtaining a pre-flash image by pre-flashing the flash assembly after obtaining an original image of the current scene through the camera assembly;

analyzing the original image, and performing statistical operations on R/G and B/G information in the original image to obtain color temperature information of the original image;

analyzing the pre-flash image, and performing statistical operations on R/G and B/G information in the pre-flash image to obtain color temperature information of the pre-flash image; and adding the color temperature information of the original image to the color temperature information of the pre-flash image to finally obtain the target value for color temperature adjustment, wherein, R is an abbreviation for red channel value of a pixel in an image, G is an abbreviation for green channel value of a pixel in an image and B is an abbreviation for blue channel value of a pixel in an image.

4. The control method of a flash assembly according to claim 3, wherein the statistical operations on the R/G and B/G information in the original image or the pre-flash image comprises:

converting the ambient light into an electrical signal via the sensor of the camera assembly; and performing a statistical operation on a value of the electrical signal of each pixel of the Bayer array in the sensor.

5. The control method of a flash assembly according to claim 1, wherein the flash assembly is an OLED display assembly.

6. The control method of a flash assembly according to claim 5, wherein the OLED display assembly comprises a substrate, an anode, a hole transport layer, an organic light-emitting layer, an electron transport layer and a cathode; the anode, the hole transport layer, the organic light-emitting layer, the electron transport layer and the cathode are sequentially provided on the substrate.

7. The control method of a flash assembly according to claim 1, wherein the target brightness value is 47.

* * * * *